US011700361B2

(12) United States Patent
Price et al.

(10) Patent No.: US 11,700,361 B2
(45) Date of Patent: Jul. 11, 2023

(54) SYSTEMS AND METHODS FOR GROUND TRUTH GENERATION USING SINGLE PHOTON AVALANCHE DIODES

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 17/306,798

(22) Filed: May 3, 2021

(65) Prior Publication Data
US 2022/0353488 A1   Nov. 3, 2022

(51) Int. Cl.
  *H04N 13/271*  (2018.01)
  *G06T 7/593*   (2017.01)
  *H04N 13/254*  (2018.01)
  *H04N 23/72*   (2023.01)

(52) U.S. Cl.
  CPC .......... *H04N 13/271* (2018.05); *G06T 7/593* (2017.01); *H04N 13/254* (2018.05); *H04N 23/72* (2023.01); *G06T 2207/20081* (2013.01)

(58) Field of Classification Search
  CPC .... H04N 13/271; H04N 13/254; H04N 23/72; H04N 23/74; H04N 23/71; H04N 13/128; H04N 2013/0081; G06T 7/593; G06T 2207/20081; G06N 20/00
  See application file for complete search history.

(56) References Cited

U.S. PATENT DOCUMENTS

| 10,521,926 B1 | 12/2019 | De Nardi et al. |
| 10,902,623 B1 | 1/2021  | Li et al. |
| 2010/0244986 A1* | 9/2010 | Kiefer ............... H03H 7/427 333/181 |
| 2019/0293771 A1* | 9/2019 | Sato .................. G01S 7/4876 |

(Continued)

OTHER PUBLICATIONS

"International Search Report and Written Opinion Issued in PCT Application No. PCT/US2022/017852", dated Jun. 3, 2022, 17 Pages.

(Continued)

*Primary Examiner* — Gevell V Selby
(74) *Attorney, Agent, or Firm* — Workman Nydegger

(57) ABSTRACT

A system for single photon avalanche diode image capture is configurable to, over a frame capture time period, selectively activate an illuminator to alternately emit light from the illuminator and refrain from emitting light from the illuminator. The system is configurable to, over the frame capture time period, perform a plurality of sequential shutter operations to configure each SPAD pixel of the SPAD array to enable photon detection. The plurality of sequential shutter operations generates, for each SPAD pixel of the SPAD array, a plurality of binary counts indicating whether a photon was detected during each of the plurality of sequential shutter operations. The system is configurable to, based on a first set of binary counts of the plurality of binary counts, generate an ambient light image. The system is configurable to, based on a second set of binary counts of the plurality of binary counts, generate an illuminated image.

20 Claims, 8 Drawing Sheets

(56) References Cited

U.S. PATENT DOCUMENTS

2020/0026057 A1   1/2020  Krueger et al.
2020/0066779 A1*  2/2020  Dutton .................. H04N 25/77
2020/0137373 A1*  4/2020  Iguchi ................. H04N 13/254
2020/0389642 A1  12/2020  Xu et al.

OTHER PUBLICATIONS

Santo, et al., "Deep Near-Light Photometric Stereo for Spatially Varying Reflectances", In Proceedings of the European Conference on Computer Vision, Aug. 23, 2020, pp. 137-152.

* cited by examiner

400

402
Over A Frame Capture Time Period, Selectively Activating An Illuminator To Alternately Emit Light From The Illuminator And Refrain From Emitting Light From The Illuminator

404
Over The Frame Capture Time Period, Performing A Plurality Of Sequential Shutter Operations To Configure Each SPAD Pixel Of A SPAD Array To Enable Photon Detection, The Plurality Of Sequential Shutter Operations Generating, For Each SPAD Pixel Of The SPAD Array, A Plurality Of Binary Counts Indicating Whether A Photon Was Detected During Each Of The Plurality Of Sequential Shutter Operations

406
Based On A First Set Of Binary Counts Of The Plurality Of Binary Counts, Generating An Ambient Light Image

408
Based On A Second Set Of Binary Counts Of The Plurality Of Binary Counts, Generating An Illuminated Image

410
Using The Ambient Light Image And The Illuminated Image As Training Data To Train An Artificial Intelligence (AI) Model

*FIG. 4*

SYSTEMS AND METHODS FOR GROUND TRUTH GENERATION USING SINGLE PHOTON AVALANCHE DIODES

BACKGROUND

Artificial intelligence (AI) models can be used to facilitate computer vision tasks. One example area where AI models have been employed is active stereo depth imaging. One example technique for active stereo depth imaging includes projecting a pattern into an environment (e.g., a dot pattern) and utilizing a stereo pair of cameras (e.g., identical cameras with a known physical offset between them) to capture a stereo pair of images of the illuminated environment. The stereo pair of images may then be rectified to cause image pixels in the different images that describe common portions of the captured environment to be aligned along scanlines (e.g., horizontal scanlines). For rectified images, the coordinates of corresponding pixels in the different images that describe common portions of the environment only differ in one dimension (e.g., the dimension of the scanlines).

A stereo matching algorithm may then search along the scanlines to identify pixels in the different images that correspond to one another (e.g., by performing pixel patch matching to identify pixels that represent common 3D points in the environment) and identify disparity values for the corresponding pixels. Disparity values may be based on the difference in pixel position between the corresponding pixels in the different images that describe the same portion of the environment. Per-pixel depth may be determined based on per-pixel disparity values, providing a depth map.

Stereo matching relies on the absence of ambiguities across the scanlines used to search for corresponding pixels in the different stereo images. Ambiguities often arise on captured surfaces that do not include sufficient texture to provide unique pixel patches in the stereo images. Thus, by projecting a pattern into the captured environment as discussed above, active stereo depth techniques may add texture to captured environments to improve the results of the stereo matching algorithm.

AI models, such as machine learning (ML) models, have been employed in active stereo approaches to add texture to captured environments in the absence of a dot pattern illuminator. ML models may be trained for such purposes using images of unilluminated environments as training input and images of illuminated environments as ground truth output. For such ML models to be trained accurately, each set of training images (i.e., an unilluminated image and a corresponding illuminated image) are captured from the same capture perspective. For example, a set of training images is often obtained by capturing an unilluminated image with a camera from a particular perspective and then subsequently illuminating the environment to capture an illuminated image with the same camera from the same perspective.

However, environments that include moving objects present many challenges for conventional techniques for capturing training images as discussed above. For example, training images are typically captured using complementary metal-oxide-semiconductor (CMOS) and/or charge-coupled device (CCD) image sensors. Such sensors may include image sensing pixel arrays where each pixel is configured to generate electron-hole pairs in response to detected photons. The electrons may become stored in per-pixel capacitors, and the charge stored in the capacitors may be read out to provide image data (e.g., by converting the stored charge to a voltage).

CMOS and/or CCD image sensors typically operate by performing an exposure operation to allow charge to collect in the per-pixel capacitors and subsequently performing a readout operation to generate image data based on the collected per-pixel charge. Thus, moving objects in a captured environment often occupy one position (or one set of positions) during exposure and/or readout of an image capturing an environment illuminated according to one structured light pattern and occupy a different position (or different set of positions) during exposure and/or readout of an image capturing an environment illuminated according to another structured light pattern (e.g., a subsequently projected structured light pattern). Thus, images captured under illumination according to different structured light patterns may include spatially misaligned representations of the same objects in the environment, which can cause errors in pixel signature determination and/or matching for generating a depth map.

Thus, for at least the foregoing reasons, there is an ongoing need and desire for improved systems and methods for generating ground truth images.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices for facilitating single photon avalanche diode (SPAD) image capture.

Some embodiments provide a system that includes a SPAD array comprising a plurality of SPAD pixels, an illuminator, one or more processors, and one or more hardware storage devices storing instructions that are executable by the one or more processors to configure the system to perform various acts. The acts include, over a frame capture time period, selectively activating the illuminator to alternately emit light from the illuminator and refrain from emitting light from the illuminator. The acts also include, over the frame capture time period, performing a plurality of sequential shutter operations to configure each SPAD pixel of the SPAD array to enable photon detection. The plurality of sequential shutter operations generates, for each SPAD pixel of the SPAD array, a plurality of binary counts indicating whether a photon was detected during each of the plurality of sequential shutter operations. The acts further include, based on a first set of binary counts of the plurality of binary counts, generating an ambient light image. The acts also include, based on a second set of binary counts of the plurality of binary counts, generating an illuminated image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates an example flow diagram depicting acts associated with ground truth generation using SPADs.

DETAILED DESCRIPTION

Figure 1:
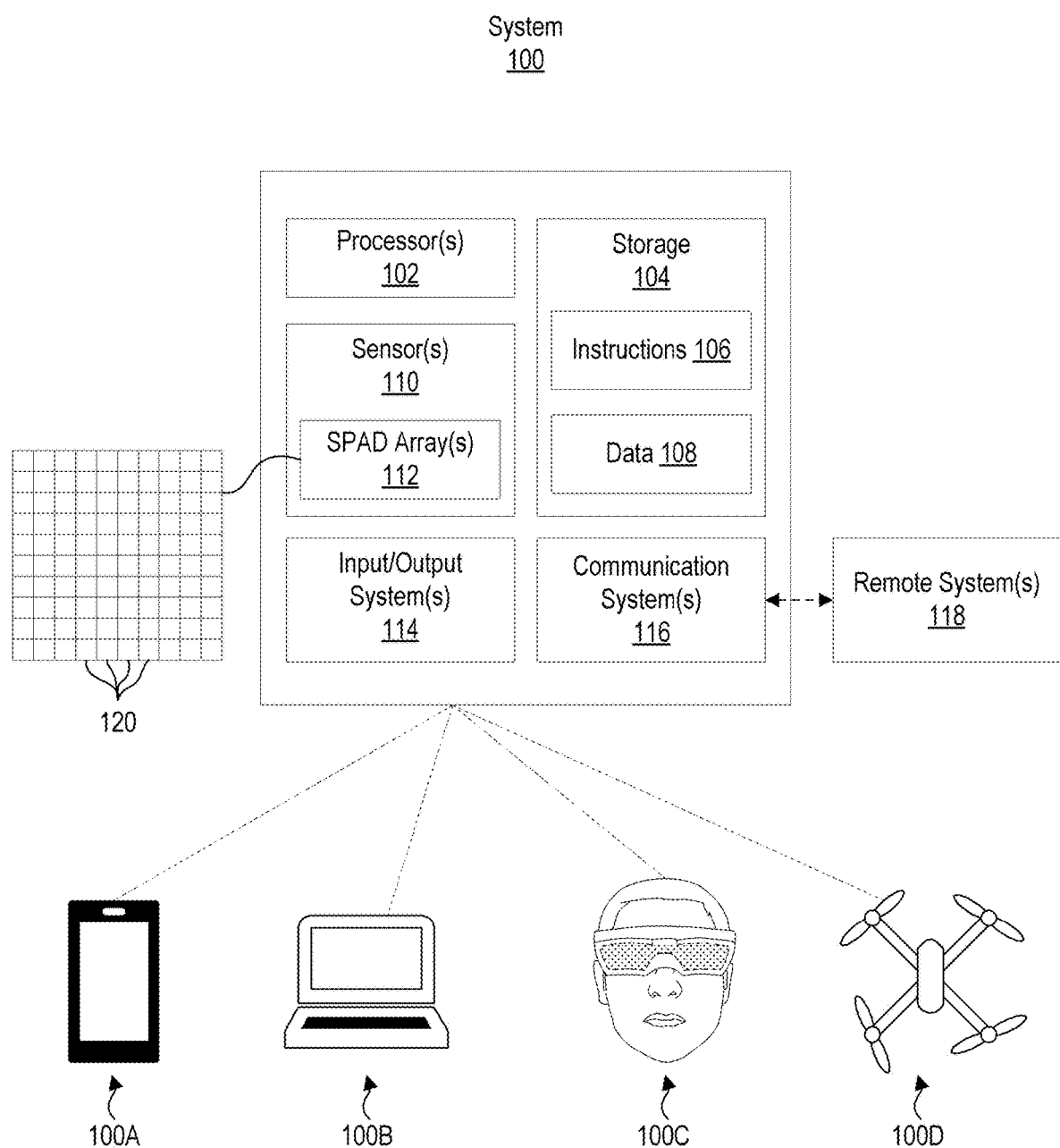
FIG. 1 illustrates example components of an example system that may include or be used to implement one or more disclosed embodiments.

Disclosed embodiments are generally directed to systems, methods and devices for facilitating ground truth generation using SPAD image sensors.

Examples of Technical Benefits, Improvements, and Practical Applications

Those skilled in the art will recognize, in view of the present disclosure, that at least some of the disclosed embodiments may be implemented to address various shortcomings associated with at least some conventional ground truth image acquisition techniques. The following section outlines some example improvements and/or practical applications provided by the disclosed embodiments. It will be appreciated, however, that the following are examples only and that the embodiments described herein are in no way limited to the example improvements discussed herein.

In contrast with conventional CMOS or CCD sensors, a SPAD is operated at a bias voltage that enables the SPAD to detect a single photon. Upon detecting a single photon, an electron-hole pair is formed, and the electron is accelerated across a high electric field, causing avalanche multiplication (e.g., generating additional electron-hole pairs). Thus, each detected photon may trigger an avalanche event. A SPAD may operate in a gated manner (each gate corresponding to a separate shutter operation), where each gated shutter operation may be configured to result in a binary output. The binary output may comprise a "1" where an avalanche event was detected during an exposure (e.g., where a photon was detected), or a "0" where no avalanche event was detected.

Separate shutter operations may be integrated over a frame capture time period. The binary output of the shutter operations over a frame capture time period may be counted, and an intensity value may be calculated based on the counted binary output.

An array of SPADs may form an image sensor, with each SPAD forming a separate pixel in the SPAD array. To capture an image of an environment, each SPAD pixel may detect avalanche events and provide binary output for consecutive shutter operations in the manner described herein. The per-pixel binary output of multiple shutter operations over a frame capture time period may be counted, and per-pixel intensity values may be calculated based on the counted per-pixel binary output. The per-pixel intensity values may be used to form an intensity image of an environment.

As will be described in more detail hereinafter, techniques of the present disclosure include performing interleaved ambient exposure and illuminated exposure operations using SPAD pixels of a SPAD array. During an ambient exposure, sequential shutter operations are performed using the SPAD pixels to generate binary counts, with each binary count indicating whether a photon was detected during a shutter operation (e.g., "1" indicating a photon was detected, "0" indicating that no photon was detected). The sequential shutter operations of the ambient exposure are performed under ambient light conditions, with no illumination added to the captured scene. During an illuminated exposure, sequential shutter operations are performed using the SPAD pixels while an illuminator emits light into the captured scene. These shutter operations also provide binary counts.

The interleaved ambient exposures and illuminated exposures are alternately performed (e.g., one after the other) over a frame capture time period, providing multiple subsets of binary counts. For example, where an ambient exposure is performed first, a first subset of binary counts may be associated with ambient exposure, a second, temporally subsequent subset of binary counts may be associated with illuminated exposure, a third, temporally subsequent subset of binary counts may be associated with ambient exposure, a fourth, temporally subsequent subset of binary counts may be associated with illuminated exposure, and so forth.

Accordingly, subsets of binary counts associated with ambient exposure can be generated not temporally contiguous to one another. The same can be true for binary counts associated with illuminated exposure. Furthermore, a subset of binary counts associated with illuminated exposure may temporally intervene between two subsets of binary counts associated with ambient exposure, and vice versa.

A system may then use all of the subsets of binary counts associated with ambient exposure to generate an ambient image, even where the subsets of binary counts associated with ambient exposure are temporally noncontiguous. Similarly, a system may use all of the subsets of binary counts associated with illuminated exposure to generate an illuminated image, even where the subsets of binary counts associated with illuminated exposure are temporally noncontiguous. The ambient image may be used as training input to an artificial intelligence (AI) model, and the illuminated image may be used as ground truth output to the AI model.

The use of SPAD image sensors to capture ambient images and illuminated images as described herein may provide a number of advantages over conventional systems and techniques for capturing ground truth images. As noted above, conventional techniques for ground truth generation include utilizing CMOS or CCD sensors to fully expose and read out an ambient image before proceeding to fully expose and read out an illuminated image, which may give rise to motion artifacts and/or spatial misalignment between the ambient image and the illuminated image. In contrast, by interleaving ambient exposures and illuminated exposures according to the present disclosure, the motion in the captured scene (and/or motion of the image sensor) will affect both the ambient image and the illuminated image in a similar manner, thereby mitigating motion artifacts and/or spatial misalignment between the ambient image and the illuminated image.

Accordingly, AI models may advantageously be trained using images that capture moving objects, which may increase the usability and/or accuracy of AI models for facilitating computer vision tasks (e.g., active stereo depth imaging).

Although at least some examples included herein are focused, in at least some respects, on images usable to train an AI model to generate an illuminated image to facilitate active stereo depth imaging, it will be appreciated, in view of the present disclosure, that the principles described herein may be applied for any image acquisition purpose. For example, any type of illumination may be used during illuminated exposures.

Having just described some of the various high-level features and benefits of the disclosed embodiments, attention will now be directed to FIGS. 1 through 4. These Figures illustrate various conceptual representations, architectures, methods, and supporting illustrations related to the disclosed embodiments.

Example Systems and Techniques for Ground Truth Generation Using SPADs

FIG. 1 illustrates various example components of a system 100 that may be used to implement one or more disclosed embodiments. For example, FIG. 1 illustrates that a system 100 may include processor(s) 102, storage 104, sensor(s) 110, SPAD array(s) 112, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with imaging using SPAD arrays. The actions may rely at least in part on data 108 (e.g., avalanche event counting or tracking, etc.) stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 118 may comprise any combination of software or hardware components that are operable to facilitate communication between on-system components/devices and/or with off-system components/devices. For example, the communications system(s) 118 may comprise ports, buses, or other physical connection apparatuses for communicating with other devices/components. Additionally, or alternatively, the communications system(s) 118 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable phenomenon. By way of non-limiting example, the sensor(s) 110 may comprise one or more image sensors, microphones, thermometers, barometers, magnetometers, accelerometers, gyroscopes, and/or others.

FIG. 1 also illustrates that the sensor(s) 110 may include SPAD array(s) 112. As depicted in FIG. 1, a SPAD array 112 may comprise an arrangement of SPAD pixels 120 that are each configured to facilitate avalanche events in response to sensing a photon, as described hereinabove. SPAD array(s) 112 may be implemented on a system 100 (e.g., an MR HMD) to facilitate various functions such as image capture and/or computer vision tasks.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), and/or other devices. Although the present description focuses, in at least some respects, on utilizing an HMD to implement techniques of the present disclosure, additional or alternative types of systems may be used.

Figure 2:
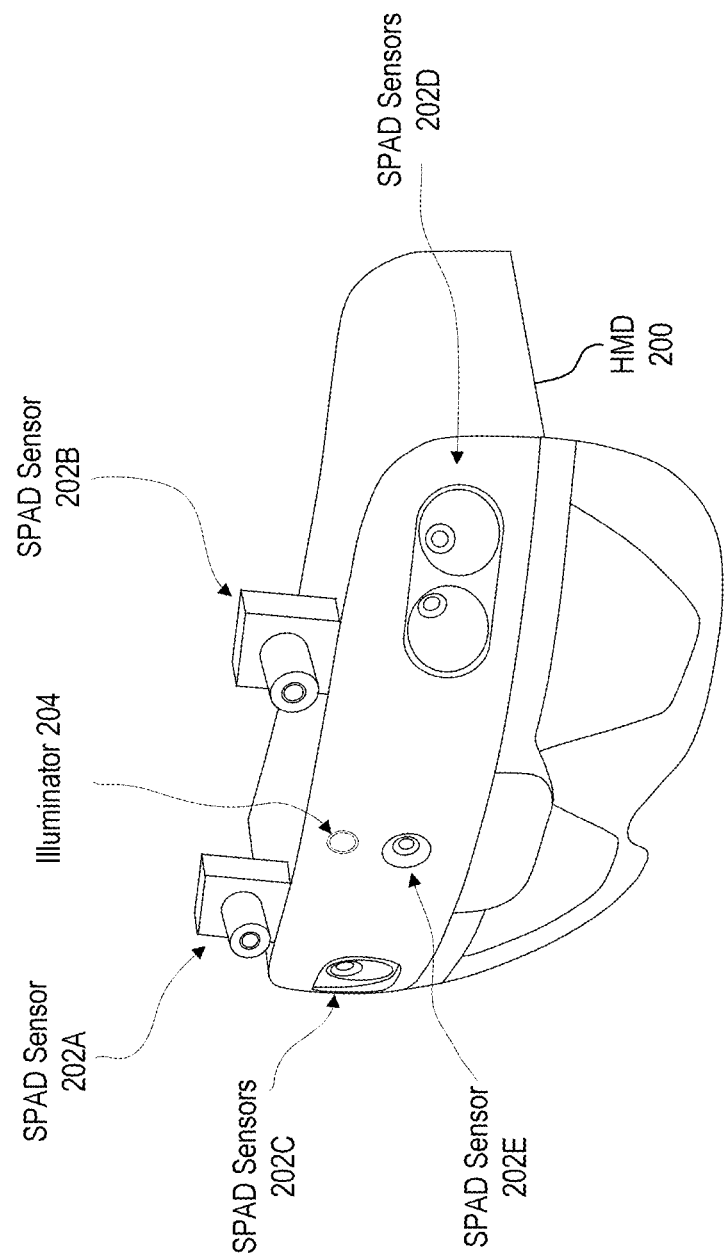
FIG. 2 illustrates an example implementations of single photon avalanche diode (SPAD) sensors in a head-mounted display (HMD)

FIG. 2 illustrates an example implementations of single photon avalanche diode (SPAD) sensors in a head-mounted display (HMD). In particular, FIG. 2 illustrates an example HMD 200, which may correspond in at least some respects to the system 100 described hereinabove with reference to FIG. 1. In the example shown in FIG. 2, the HMD 200 includes SPAD sensors 202A and 202B, which together may comprise a stereo pair of SPAD sensors. The SPAD sensors 202A and 202B may be configured to capture intensity image frames as described hereinabove (e.g., by counting photons or avalanche events detected over a frame capture time period on a per-pixel basis). Intensity images captured using the SPAD sensors 202A and 202B may be used for a variety of purposes, such as to facilitate image/video capture, pass-through imaging, depth computations (e.g., active stereo depth imaging), object tracking, object segmentation, surface reconstruction, simultaneous localization and mapping (SLAM), and/or others. The HMD 200 may implement any number of additional or alternative SPAD sensors 202C, 202D, 202E for the same and/or other purposes (e.g., a SPAD sensor coupled with an active illuminator, providing a gated time-of-flight sensor).

FIG. 2 also illustrates the HMD 200 as comprising an illuminator 204, which may take the form of any suitable light emitting device. As will be described herein, a system (e.g., an HMD 200 or/or other device) may operate an illuminator (e.g., illuminator 204) in conjunction with one or more SPAD sensors (e.g., SPAD sensors 202A-202E) to capture images that are usable to form training data for training an AI model. For example, a system may selectively (or iteratively) activate the illuminator (e.g., in a pulsed manner) to allow the SPAD sensor(s) 202A-202E to capture one or more illuminated images of an environment (as well as one or more unilluminated images of the environment).

In accordance with the present disclosure, the illuminator 204 may take on various forms to facilitate various types of illumination for capturing various types of illuminated images. For example, the illuminator 204 may be configured to emit visible light, infrared light, ultraviolet light, combinations thereof, and/or light in other spectral ranges. In some instances, as indicated above, the illuminator 204 may be configured to emit one or more light patterns for adding texture to a real-world environment. Using light patterns to add texture to an environment may provide illuminated images that are well-suited for facilitating computer vision tasks, such as stereoscopic depth computations, object tracking, optical flow computations, and/or others.

As another example, rather than emitting a light pattern, the illuminator 204 may be configured to emit light within a wavelength band (e.g., UV light) that is selected to trigger fluorescence in one or more objects of a captured environment. For instance, one or more objects may be coated with a fluorescent paint, such that under illumination by the illuminator, the coating on the object fluoresces, adding perceivable texture to the object (or otherwise highlighting the object, such as to facilitate object segmentation).

In some implementations, such as to obtain illuminated images for facilitating SLAM, the illuminator 204 may be physically untethered from the SPAD sensor(s) to allow the illuminated images to capture added texture that does not move with the capture perspective of the SPAD sensor(s).

One will appreciate, in view of the present disclosure, that although FIG. 2 only illustrates a single illuminator 204 on the HMD 200, any number of illuminators may be used with any type(s) of system(s) to practice techniques of the present disclosure.

Figure 3A:
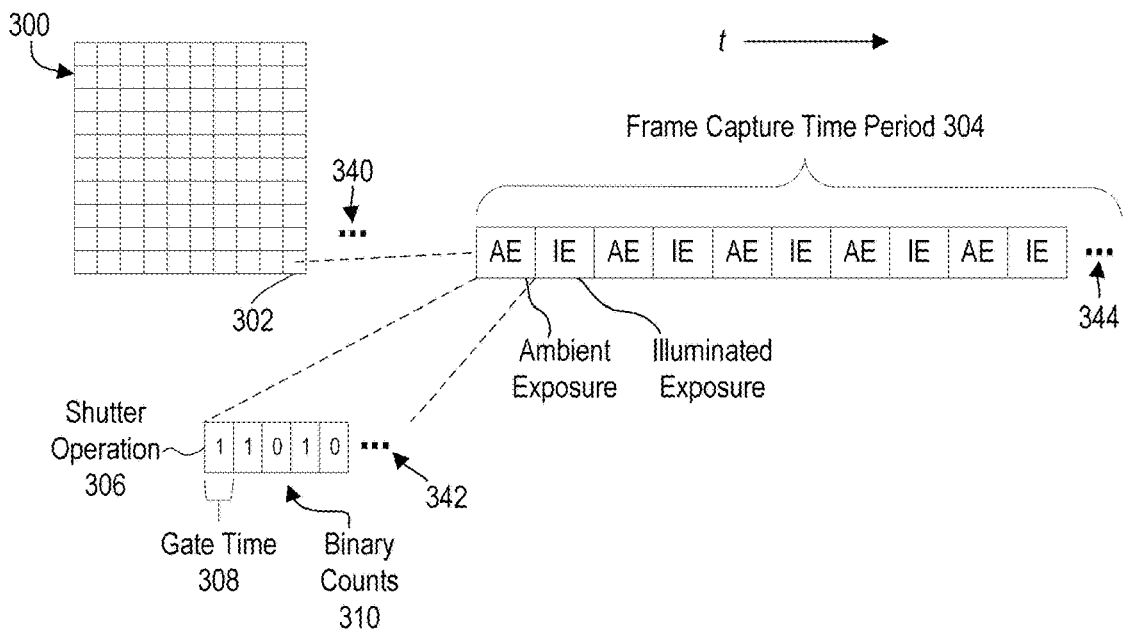
FIGS. 3A-3C illustrate an example of SPAD exposure operations performed over a frame capture time period.
Figure 3B:
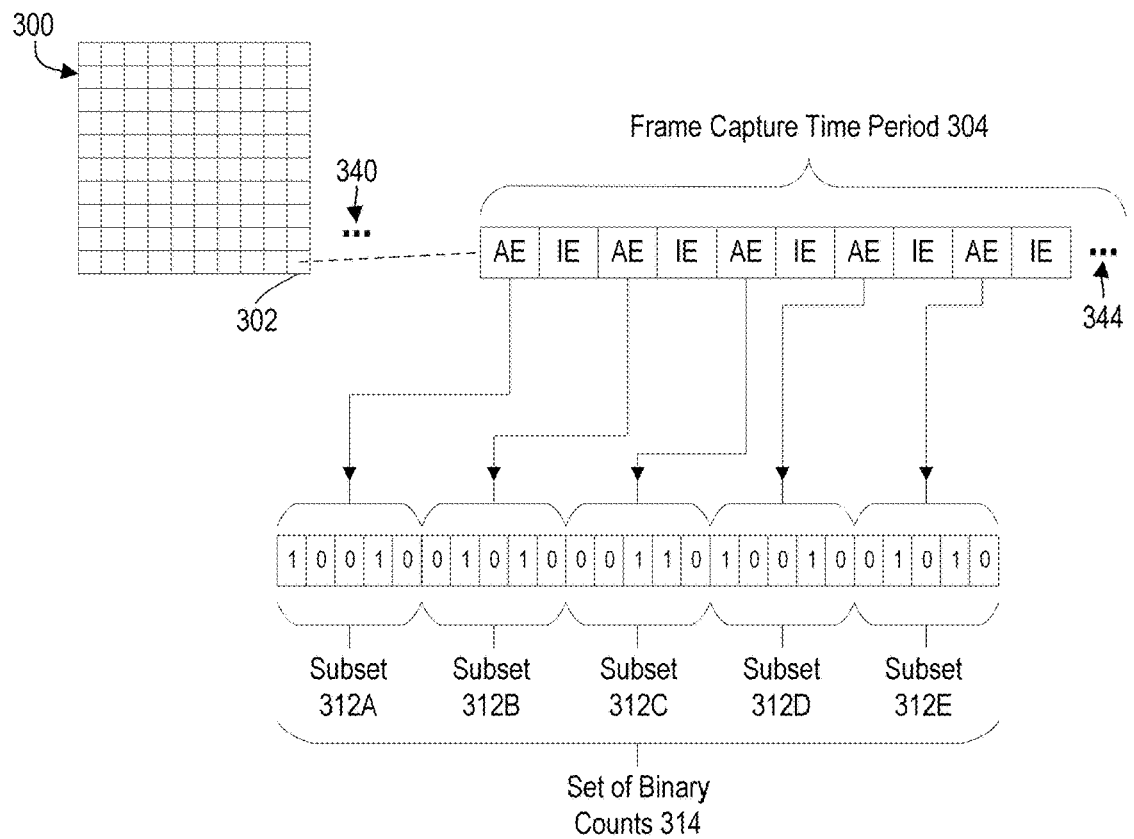
Figure 3C:
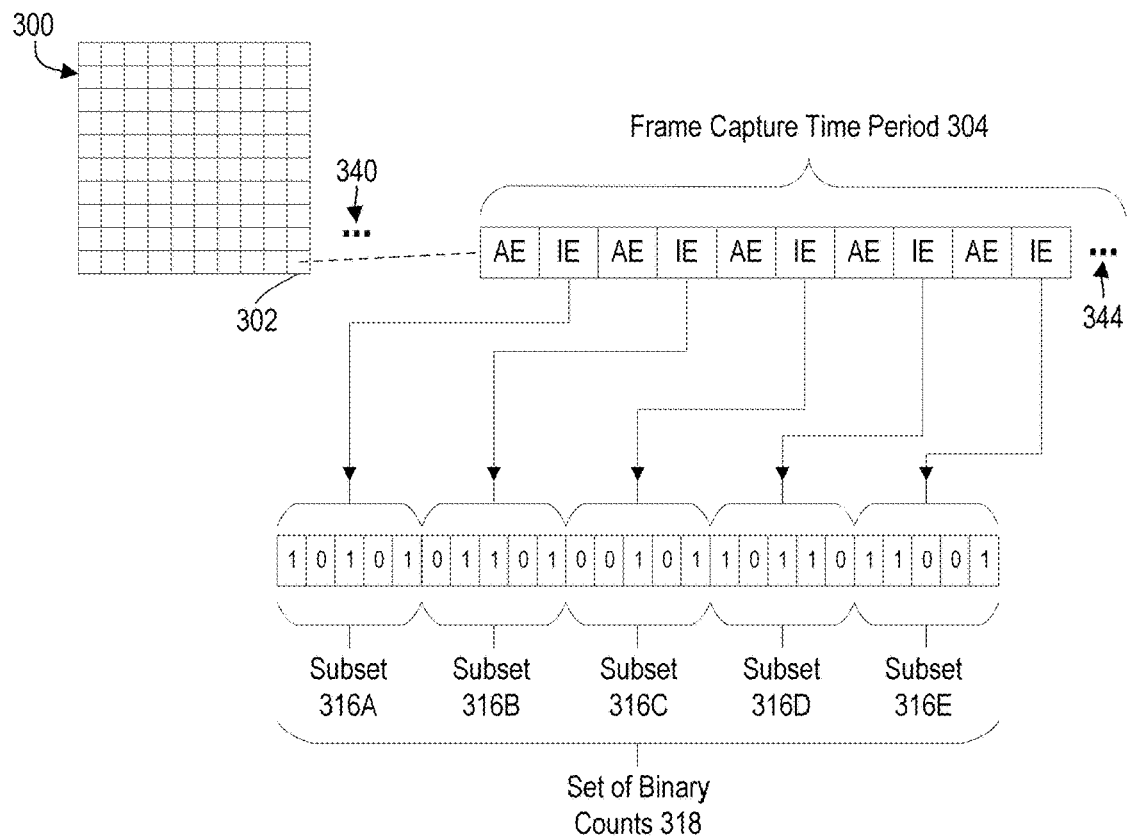

FIGS. 3A-3C illustrate an example of SPAD exposure operations performed over a frame capture time period. In particular, FIG. 3A illustrates a SPAD array 300, which may correspond to the SPAD array(s) 112 described hereinabove with reference to FIG. 1. In this regard, each SPAD pixel (e.g., SPAD pixel 302) of the SPAD array 300 is configurable to trigger avalanche events in response to detecting photons. The SPAD pixel 302 may be operated in a controlled, gated manner to facilitate different exposure operations for image acquisition.

FIG. 3A depicts ellipsis 340 between SPAD pixels of the SPAD array 300 and representations of exposure operations that will be described in more detail hereafter. The ellipsis 340 indicates that the exposure operations described hereafter may be performed using any number of SPAD pixels of a SPAD array 300 (e.g., all SPAD pixels). A single representation of the exposure operations is shown in FIG. 3A (and subsequent Figures) for the sake of clarity and simplicity. FIG. 3A additionally provides a time axis t to illustrate the temporal relationship among the different exposure operations that will be described hereinafter.

FIG. 3A shows that, to facilitate capturing of image frames usable as training data, SPAD pixels of a SPAD array 300 are configured to perform multiple exposure operations in an interleaved manner. In particular, FIG. 3A illustrates ambient exposure operations (labeled as "AE" in FIG. 3A and referred to hereinafter as "AE operations") and illuminated exposure operations (labeled as "IE" in FIG. 3A and referred to hereinafter as "IE operations") performed over a frame capture time period 304. In the example shown in FIG. 3A, the AE operations and IE operations are performed in an interleaved manner, with an IE operation following each AE operations, and with an AE operation following each IE operation. The ellipsis 344 indicates that any number of AE operations and IE operations may be performed over the frame capture time period 304.

FIG. 3A furthermore illustrates (via dashed lines extending downward from the first AE operation) that an AE operation includes applying a set of shutter operations 306. As noted above, applying a shutter operation to a SPAD pixel configures the SPAD pixel for photon detection by configuring the SPAD pixel to trigger avalanche events in response to detected photons. Thus, the presence of an avalanche event during a shutter operation indicates that the SPAD pixel detected a photon during the shutter operation. Whether a SPAD pixel experienced an avalanche event (and therefore detected a photon) during a shutter operation may be represented by a binary "1" or "0", with "1" indicating that an avalanche event occurred during the shutter operation and with "0" indicating that no avalanche event occurred during the shutter operation. Accordingly, FIG. 3A depicts binary counts 310 associated with each shutter operation 306. The ellipsis 342 indicates that an AE operation may comprise any suitable number of shutter operations 306.

FIG. 3A also depicts that the individual shutter operations 306 are performed over a particular gate time 308. The gate time 308 is the duration over which a SPAD pixel becomes configured to trigger an avalanche event in response to a detected photon.

Although FIG. 3A only explicitly depicts the set of shutter operations 306 associated with the first AE operation, other sets of shutter operations are applied to facilitate the other exposures (i.e., the other AE operations and the IE operations). For each IE operation, shutter operations 306 are performed while an illuminator (e.g., illuminator 204) is selectively activated (or pulsed) to illuminate the environment being captured. In contrast, for each AE operation, shutter operations 306 are performed while the illuminator selectively refrains from illuminating the environment. In this regard, over the frame capture time period, the illuminator (e.g., illuminator 204) alternately emits light and refrains from emitting light.

As noted above, the ellipsis 344 indicates that any number of AE operations and IE operations may be performed over the frame capture time period 304. As will be described in more detail hereafter, the results of the AE operations may be combined to form an ambient image, and the results of the IE operations may be combined to form an illuminated image. To provide desirable images, in some instances, at least two IE operations are performed over a frame capture time period 304 (causing at least two emissions of light from an illuminator over the frame capture time period 304), and at least two AE operations are performed over the frame capture time period 304. Furthermore, in some instances, systems refrain from pausing performance of the shutter operations 306 within the frame capture time period 304 in order to avoid motion artifacts. For example, systems may refrain from pausing performance of the shutter operations to perform readout operations (although, under some configurations, readout operations may be performed passively during the frame capture time period 304 without pausing performance of the shutter operations).

The shutter operations 306 performed during each separate AE operation (i.e., without emission of light by the illuminator) may provide a separate subset of binary counts. For example, FIG. 3B illustrates various subsets 312A, 312B, 312C, 312D, and 312E of binary counts. Each subset 312A, 312B, 312C, 312D, and 312E of binary counts is associated with a different respective AE operation (illustrated in FIG. 3B by the arrows extending from the various AE operations to the various subsets 312A, 312B, 312C, 312D, and 312E of binary counts). As indicated above, and as depicted in FIG. 3B, the various subsets 312A, 312B, 312C, 312D and 312E of binary counts are not generated temporally contiguous to one another (i.e., because the IE operations intervene between the AE operations). The various subsets 312A, 312B, 312C, 312D, and 312E of binary counts may be combined to form a set of binary counts 314, and the set of binary counts 314 may be used for generating an ambient image, even though the various subsets 312A, 312B, 312C, 312D, and 312E of binary counts that form the set of binary counts 314 are not temporally contiguous (see FIG. 3D).

Similarly, the shutter operations 306 performed during each separate IE operation (i.e., during emission of light by the illuminator) may provide a separate subset of binary counts. For example, FIG. 3C illustrates various subsets 316A, 316B, 316C, 316D, and 316E of binary counts. Each subset 316A, 316B, 316C, 316D, and 316E of binary counts is associated with a different respective IE operation (illustrated in FIG. 3C by the arrows extending from the various IE operations to the various subsets 316A, 316B, 316C, 316D, and 316E of binary counts). As indicated above, and as depicted in FIG. 3C, the various subsets 316A, 316B, 316C, 316D and 316E of binary counts are not generated temporally contiguous to one another (i.e., because the AE operations intervene between the IE operations). The various subsets 316A, 316B, 316C, 316D, and 316E of binary counts may be combined to form a set of binary counts 318, and the set of binary counts 318 may be used for generating an illuminated image, even though the various subsets 316A, 316B, 316C, 316D, and 316E of binary counts that form the set of binary counts 318 are not temporally contiguous (see FIG. 3D).

Although FIG. 3B only illustrates a single set of binary counts 314 obtained from shutter operations 306 performed by a single SPAD pixel 302 during AE operations over the frame capture time period 304, separate sets of binary counts from AE operations may be generated for each SPAD pixel of the SPAD array 300. Similarly, although FIG. 3C only illustrates a single set of binary counts 318 obtained from shutter operations 306 performed by a single SPAD pixel 302 during IE operations over the frame capture time period 304, separate sets of binary counts from IE operations may be generated for each SPAD pixel of the SPAD array 300.

Figure 3D:
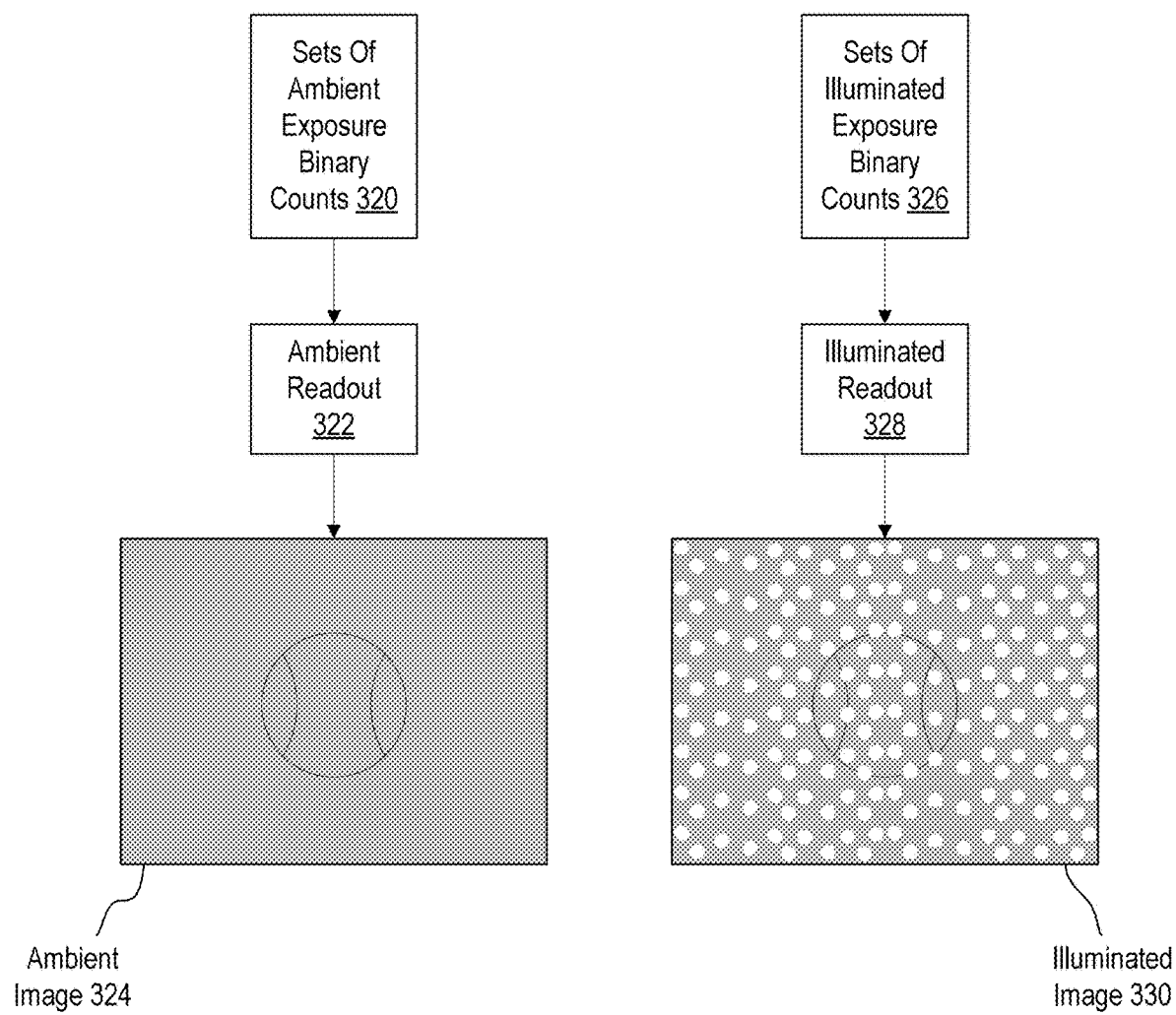
FIG. 3D illustrates example images generated from binary counts obtained via shutter operations performed over the frame capture time period.

FIG. 3D illustrates sets of ambient exposure binary counts 320, which includes each set of binary counts generated by each SPAD pixel of the SPAD array 300 during AE operations (see FIGS. 3A-3C). Each set of binary counts of the sets of ambient exposure binary counts 320 (e.g., including set of binary counts 314 from FIG. 3B) includes a respective plurality of subsets of binary counts (e.g., subsets 312A-312E for set of binary counts 314) generated by a SPAD pixel (e.g., SPAD pixel 302) during the AE operations over the frame capture time period 304.

FIG. 3D also illustrates ambient readout 322 performed using the sets of ambient exposure binary counts 320. For a SPAD array, a "readout" comprises determining or outputting a number of photons detected over a set of shutter operations on a per-pixel basis. Pixels capturing brighter portions of a captured environment will have counted a greater number of photons than pixels capturing darker portions of the captured environment. The per-pixel number of photons detected over the set of shutter operations may therefore be used to form an intensity image.

Accordingly, ambient readout 322 may comprise determining or outputting the number of photons represented by each set of binary counts of the sets of ambient exposure binary counts 320, where each set corresponds to a different SPAD pixel. Per-pixel intensity values may be determined based on the number of photons from each set, and the per-pixel intensity values may be used to generate the ambient image 324.

Similarly, FIG. 3D illustrates sets of illuminated exposure binary counts 326, which includes each set of binary counts generated by each SPAD pixel of the SPAD array 300 during IE operations (see FIGS. 3A-3C). Each set of binary counts of the sets of illuminated exposure binary counts 326 (e.g., including set of binary counts 318 from FIG. 3C) includes a respective plurality of subsets of binary counts (e.g., subsets 316A-316E for set of binary counts 318) generated by a SPAD pixel (e.g., SPAD pixel 302) during the IE operations over the frame capture time period 304.

FIG. 3D also illustrates illuminated readout 328 performed using the sets of illuminated exposure binary counts 326. Illuminated readout 328 may comprise determining or outputting the number of photons represented by each set of binary counts of the sets of illuminated exposure binary counts 326, where each set corresponds to a different SPAD pixel. Per-pixel intensity values may be determined based on the number of photons from each set, and the per-pixel intensity values may be used to generate the illuminated image 330.

As is evident from FIG. 3D, ambient image 324 includes a representation of a moving ball captured by the SPAD array 300, and illuminated image 330 includes a representation of the same moving ball captured by the SPAD array 300 under illumination by the illuminator (e.g., illuminator 204). Because the AE operations used to generate the ambient image 324 are interleaved with the IE operations used to generate the illuminated image 330 over the same frame capture time period 304, the moving ball is depicted in both the ambient image 324 and the illuminated image 330 in a spatially aligned manner. Stated differently, the motion of the ball will affect the capturing of the ambient image 324 in substantially the same way that it will affect the capturing of the illuminated image 330.

The illuminated image 330 indicates that the light projected by the illuminator comprises a structured light dot pattern configured to add detectable texture to the captured scene (e.g., to facilitate stereo matching). In this regard, the illuminated image 330 may be regarded as a texturized image, which includes texturized representations of the objects depicted without added texture in the ambient image 324. Because the representations of the moving ball are substantially spatially aligned in the ambient image 324 and the illuminated image 330, the ambient image 324 and the illuminated image 330 may be well-suited for use as training data to train an AI model, such as an AI model for receiving an input image and providing an output image that adds texture to the objects depicted in the input image (e.g., structured light image output from ambient image input).

Figure 3E:
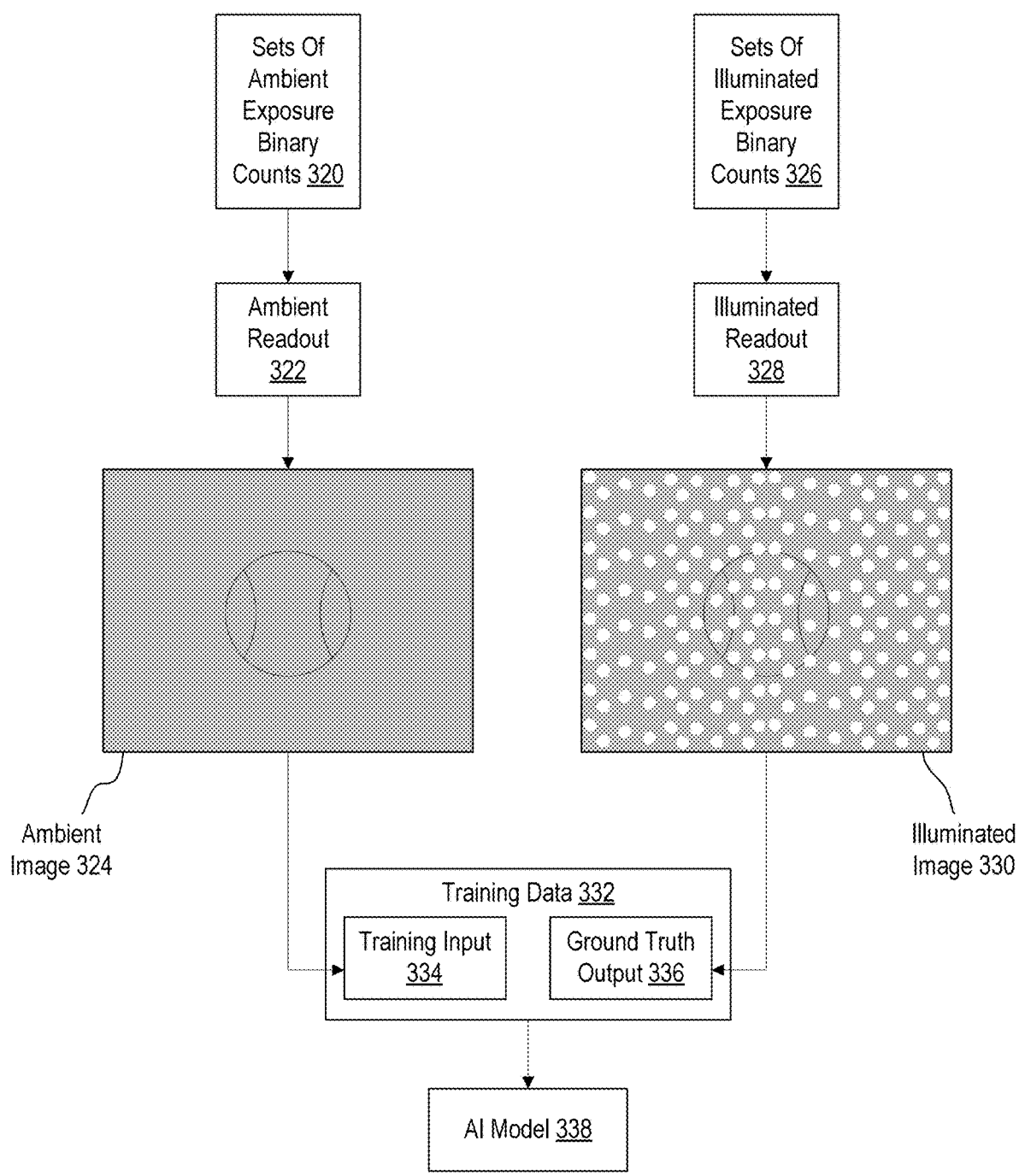
FIG. 3E illustrates an example of training an artificial intelligence (AI) model using the images generated from the binary counts.

FIG. 3E illustrates an example of training an AI model 338 using the ambient image 324 and the illuminated image 330. In particular, FIG. 3E illustrates the illuminated image 330 and the ambient image 324 being used to form training data 332 for training the AI model 338. The training data 332 includes training input 334 (e.g., typifying images that the AI model 338 may receive as input after being trained) and ground truth output 336 (e.g., typifying image output that the AI model 338 is being trained to generate based on the training input 334).

FIG. 3E shows the illuminated image 330 being provided as ground truth output 336 and shows the ambient image 324 being provided as training input 334. Using the illuminated image 330 (e.g., a texturized form of the ambient image 324) as ground a ground truth image for training the AI model 338 may configure or train the AI model to generate or infer a texturized form of an input image (or to generate or infer an illuminated image from an ambient image input), or to infer other types of output such as depth data (e.g., a depth map or a depth image), optical flow information, and/or others. Texturized image output may be useful, by way of non-limiting example, to facilitate various computer vision tasks such as depth computations, optical flow computations, object tracking, SLAM, and/or others.

Although at least some examples included herein are focused, in at least some respects, on images usable to train an AI model to generate a structured light image to facilitate active stereo depth imaging, it will be appreciated, in view of the present disclosure, that the principles described herein may be applied for any purpose. For instance, any type or spectrum of illumination may be emitted during the illuminated exposures, such as visible light, infrared light, ultraviolet light, flood-filled light, dot pattern light (e.g., to facilitate ground truth spatial structured light or head tracking data), or a stripe or sine wave pattern (e.g., to facilitate temporal structured light). For example, the illumination may comprise flood-filled illumination (e.g., flood-filled ultraviolet (UV) light) emitted to trigger fluorescence for adding texture or other distinguishing aspects to one or more captured objects (e.g., objects coated with fluorescent material). Such functionality may be advantageous for training an AI model to perform optical flow analysis, object segmentation, object tracking, and/or other computer vision tasks.

Although FIG. 3E only illustrates the training data 332 as including a single element as training input 334 (i.e., the ambient image 324) and a single element as ground truth output 336 (i.e., the illuminated image 330), one will appreciate, in view of the present disclosure, that multiple sets of ambient images and illuminated images may be used as training data 332 to train an AI model 338.

Example Method(s) for Ground Truth Generation Using SPADs

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

FIG. 4 illustrates an example flow diagram 400 depicting acts associated with ground truth generation using SPADs. The discussion of the various acts represented in flow diagram 400 include references to various hardware components described in more detail with reference to FIGS. 1 and/or 2.

Act 402 of flow diagram 400 includes, over a frame capture time period, selectively activating an illuminator to alternately emit light from the illuminator and refrain from emitting light from the illuminator. Act 402 is performed, in some instances, utilizing one or more components of a system 100 (e.g., processor(s) 102, storage 104, sensor(s) 110, SPAD array(s) 112, I/O system(s) 114, communication system(s) 116), an illuminator (e.g., illuminator 204), and/or other components. In some instances, alternately emitting light from the illuminator includes causing light to be emitted from the illuminator at least twice over the frame capture time period. Furthermore, in some instances, the illuminator is configured to emit one or more light patterns configured to add texture to a real-world environment. The illuminator may be configured to emit visible light, infrared light, ultraviolet, combinations thereof, and/or other types of light. In some implementations, illuminator is configured to emit light of a wavelength selected to trigger fluorescence in one or more objects within a real-world environment.

Act 404 of flow diagram 400 includes, over the frame capture time period, performing a plurality of sequential shutter operations to configure each SPAD pixel of a SPAD array to enable photon detection, the plurality of sequential shutter operations generating, for each SPAD pixel of the SPAD array, a plurality of binary counts indicating whether a photon was detected during each of the plurality of sequential shutter operations. Act 404 is performed, in some instances, utilizing one or more components of a system 100 (e.g., processor(s) 102, storage 104, sensor(s) 110, SPAD array(s) 112, I/O system(s) 114, communication system(s) 116) and/or other components. In some instances, performing the plurality of sequential shutter operations includes refraining from pausing performance of the shutter operations to perform a readout operation during the frame capture time period. Furthermore, in some implementations, the first set of binary counts includes a first plurality of subsets of binary counts generated via the SPAD pixels of the SPAD array without emission of light by the illuminator, and each of the first plurality of subsets of binary counts are not generated temporally contiguous to one another. Furthermore, in some implementations, the second set of binary counts comprises a second plurality of subsets of binary counts generated via the SPAD pixels of the SPAD array during emission of light by the illuminator, and each of the second plurality of subsets of binary counts are not generated temporally contiguous to one another. In some instances, at least one subset of binary counts of the second plurality of subsets of binary counts temporally intervenes between at least two subsets of binary counts of the first plurality of subsets of binary counts. The SPAD array may, in some instances, be implemented on a head-mounted display (HMD), and the illuminator may be physically untethered from the HMD.

Act 406 of flow diagram 400 includes, based on a first set of binary counts of the plurality of binary counts, generating an ambient light image. Act 406 is performed, in some instances, utilizing one or more components of a system 100 (e.g., processor(s) 102, storage 104, sensor(s) 110, SPAD array(s) 112), I/O system(s) 114, communication system(s) 116) and/or other components. In some implementations, the ambient light image comprises or is usable to generate a training input image.

Act 408 of flow diagram 400 includes, based on a second set of binary counts of the plurality of binary counts, generating an illuminated image. Act 408 is performed, in some instances, utilizing one or more components of a system 100 (e.g., processor(s) 102, storage 104, sensor(s) 110, SPAD array(s) 112), I/O system(s) 114, communication system(s) 116) and/or other components. In some implementations, the illuminated image comprises or is usable to generate a ground truth image.

Act 410 of flow diagram 400 includes using the ambient light image and the illuminated image as training data to train an artificial intelligence (AI) model. Act 410 is performed, in some instances, utilizing one or more components of a system 100 (e.g., processor(s) 102, storage 104, sensor(s) 110, SPAD array(s) 112), I/O system(s) 114, communication system(s) 116) and/or other components. In some instances, training the AI model includes utilizing the ambient light image as training input and utilizing the illuminated image as ground truth output. Training the AI model may configure the AI model to generate or infer texturized image output from ambient image input, generate or infer segmented image output from ambient image input, generate or infer depth image output from ambient image input, and/or generate or infer optical flow information from ambient image input.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for single photon avalanche diode (SPAD) image capture, the system comprising:
    a SPAD array comprising a plurality of SPAD pixels;
    an illuminator;
    one or more processors; and
    one or more hardware storage devices storing instructions that are executable by the one or more processors to configure the system to:
        over a frame capture time period, selectively activate the illuminator to alternately emit light from the illuminator and refrain from emitting light from the illuminator;
        over the frame capture time period, perform a plurality of sequential shutter operations to configure each SPAD pixel of the SPAD array to enable photon detection, the plurality of sequential shutter operations generating, for each SPAD pixel of the SPAD array, a plurality of binary counts indicating whether a photon was detected during each of the plurality of sequential shutter operations;
        based on a first set of binary counts of the plurality of binary counts, generate an ambient light image; and
        based on a second set of binary counts of the plurality of binary counts, generate an illuminated image.

2. The system of claim 1, wherein alternately emitting light from the illuminator comprises causing light to be emitted from the illuminator at least twice over the frame capture time period.

3. The system of claim 1, wherein performing the plurality of sequential shutter operations comprises refraining from pausing performance of the shutter operations to perform a readout operation during the frame capture time period.

4. The system of claim 1, wherein:
    the first set of binary counts comprises a first plurality of subsets of binary counts generated via the SPAD pixels of the SPAD array without emission of light by the illuminator,
    each of the first plurality of subsets of binary counts are not generated temporally contiguous to one another,
    the second set of binary counts comprises a second plurality of subsets of binary counts generated via the SPAD pixels of the SPAD array during emission of light by the illuminator, and
    each of the second plurality of subsets of binary counts are not generated temporally contiguous to one another.

5. The system of claim 4, wherein at least one subset of binary counts of the second plurality of subsets of binary counts temporally intervenes between at least two subsets of binary counts of the first plurality of subsets of binary counts.

6. The system of claim 1, wherein the illuminator is configured to emit one or more light patterns configured to add texture to a real-world environment.

7. The system of claim 6, wherein the illuminator is configured to emit visible light.

8. The system of claim 6, wherein the illuminator is configured to emit infrared light.

9. The system of claim 6, wherein the SPAD array is implemented on a head-mounted display (HMD), and wherein the illuminator is physically untethered from the HMD.

10. The system of claim 1, wherein the illuminator is configured to emit light of a wavelength selected to trigger fluorescence in one or more objects within a real-world environment.

11. The system of claim 10, wherein the illuminator is configured to emit ultraviolet light.

12. The system of claim 1, wherein the illuminated image comprises or is usable to generate a ground truth image.

13. The system of claim 12, wherein the instructions are executable by the one or more processors to further configure the system to use the ambient light image and the illuminated image as training data to train an artificial intelligence (AI) model.

14. The system of claim 13, wherein training the AI model comprises utilizing the ambient light image as training input and utilizing the illuminated image as ground truth output.

15. The system of claim 14, wherein training the AI model configures the AI model to infer texturized image output from ambient image input.

16. The system of claim 14, wherein training the AI model configures the AI model to infer segmented image output from ambient image input.

17. The system of claim 14, wherein training the AI model configures the AI model to infer depth image output from ambient image input.

18. The system of claim 14, wherein training the AI model configures the AI model to infer optical flow information output from ambient image input.

19. A method for single photon avalanche diode (SPAD) image capture, the method comprising:
- over a frame capture time period, selectively activating an illuminator to alternately emit light from the illuminator and refrain from emitting light from the illuminator;
- over the frame capture time period, performing a plurality of sequential shutter operations to configure each SPAD pixel of a SPAD array to enable photon detection, the plurality of sequential shutter operations generating, for each SPAD pixel of the SPAD array, a plurality of binary counts indicating whether a photon was detected during each of the plurality of sequential shutter operations;
- based on a first set of binary counts of the plurality of binary counts, generating an ambient light image; and
- based on a second set of binary counts of the plurality of binary counts, generating an illuminated image.

20. One or more hardware storage devices storing instructions that are executable by one or more processors of a system to configure the system for single photon avalanche diode (SPAD) image capture by configuring the system to:
- over a frame capture time period, selectively activate an illuminator to alternately emit light from the illuminator and refrain from emitting light from the illuminator;
- over the frame capture time period, perform a plurality of sequential shutter operations to configure each SPAD pixel of a SPAD array to enable photon detection, the plurality of sequential shutter operations generating, for each SPAD pixel of the SPAD array, a plurality of binary counts indicating whether a photon was detected during each of the plurality of sequential shutter operations;
- based on a first set of binary counts of the plurality of binary counts, generate an ambient light image; and
- based on a second set of binary counts of the plurality of binary counts, generate an illuminated image.

* * * * *